Jan. 19, 1960    E. N. LOWRY    2,921,813
AUXILIARY LIGHT SHIELD APPARATUS FOR MOTOR VEHICLES
Filed April 11, 1958

INVENTOR.
EARL N. LOWRY
BY M. Ralph Shaffer
HIS ATTORNEY

United States Patent Office 2,921,813
Patented Jan. 19, 1960

2,921,813
AUXILIARY LIGHT SHIELD APPARATUS FOR MOTOR VEHICLES

Earl N. Lowry, Salt Lake City, Utah, assignor to M. Ralph Shaffer, Salt Lake City, Utah Application April 11, 1958, Serial No. 727,936

7 Claims. (Cl. 296—97)

This invention relates to auxiliary light shields for use in automobiles and trucks, and more particularly to new and improved, auxiliary light shield apparatus, readily and conveniently mountable within the passenger interior of a motor vehicle, which is designed to supplement the vehicle's permanently installed visor or glare shield in giving relief from the visual discomfort which is produced by the glare of the sun's rays and other bright objects.

In generally accepted parlance in the automotive-parts industry the term "light shield" is generic to visor type shields and to glare shields. The terms "visor" and "sun-visor" refer to an opaque light shield, generally manufactured from cloth or a suitable plastic material, which is mounted for rotational displacement about an axis-rod permanently installed above the vehicle's front windshield on the driver's side. In some instances, of course, an additional visor is mounted on the right-hand side, or passenger side, of the vehicle in a corresponding position above the windshield. In being of opaque character, the visor prevents completely impingement upon the eye of those rays of light which, but for the interposition of the visor, would normally produce eyestrain.

The term "glare shield" refers to a device which is similar to a "visor," both in configuration and in mounting, but which is fabricated in the main from a translucent material, for example, a plastic such as that going under the trade-name Celluloid which has been moderately to darkly tinted. Glare shields do not completely eliminate but merely reduce the intensity of light emanating from the sun or other bright objects when passing therethrough. Accordingly, one use which is made of the glare shield is for night driving, to lessen the headlight glare of oncoming traffic. Nonetheless, glare shields are of reduced effectiveness in precluding the eye distress present when the sun is low and is viewed through the same. Furthermore, there is no eye protection whatever when the sun is low and, relative to the driver, in a measure to the right of the right-hand edge of the driver's visor or glare shield.

It is highly desirable that there be installed, at least on the driver's side of the vehicle, a combination glare shield and visor, with the former being disposed forwardly of the latter. See, for example, United States Patent 2,622,922, granted to C. D. Schroeder in 1952. Thus, when mere glare reduction is desired, the glare shield may be selectively oriented vertically in an operating position; however, when total glare elimination is needed, the opaque visor will be positioned vertically. This feature the present invention also accomplishes.

But it is also desirable that the permanently installed visor or glare shield be provided with an extension, to provide eye protection against bright objects which appear somewhat to the right of the right extremity of the permanent light shield. See in this regard United States Patent No. 2,701,612, granted to M. T. Steidl in 1955. This feature the present invention also incorporates.

Accordingly, it is an object of the present invention to provide a new and improved, auxiliary light shield (of both visor and glare shield types) for motor vehicles, which auxiliary light shield may be easily and conveniently mounted on the permanent shield mounted within a given motor vehicle.

It is a further object of the present invention to provide new and improved, auxiliary light shield apparatus which will be laterally extendable beyond the permanent shield to which it is attached and yet rotationally displaceable about an axis parallel to and in close proximity with the axis-rod of the permanently installed light shield, so as to afford wide versatility and range, and optimum effectiveness.

According to the present invention, an auxiliary light shield (either of the visor or glare shield type) is slideably mounted on a lateral slide rod disposed parallel to and in proximity with the axis-rod of the permanently installed light shield (likewise either of the visor or glare shield type). Clamps attach the slide rod to the permanent light shield. The auxiliary light shield in being slideably mounted onto its slide rod is extendable beyond the permanent light shield so as to increase the range area of protection both for the driver and perhaps also for the passenger seated to his right.

In being rotationally displaceable, also, about the slide rod, the auxiliary light shield may be oriented vertically, horizontally, or at an intermediate position as desired, so as to cooperate with the permanent light shield in giving desired, selective protection.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1 is a front elevational view of the auxiliary light shield apparatus as contemplated by the present invention. While the drawing indicates that the principal portion of the auxiliary light shield apparatus is translucent, it will be understood that the drawing applies with equal validity to those situations in which an opaque member is chosen to serve as the principal member of the apparatus. This initial observation applies with equal validity to Figures 2 and 5.

Figure 1:
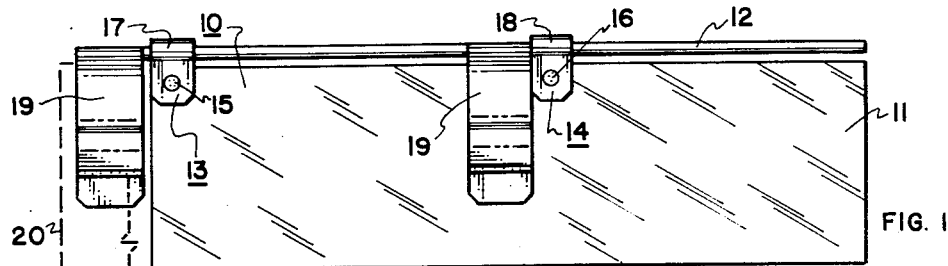

In Figure 1, auxiliary light shield apparatus 10 includes a principal member light shield 11. When light shield 11 constitutes a glare shield, then it will consist of a moderately-to-darkly tinted plastic as heretofore indicated. On the other hand, when light shield 11 is to constitute a sun visor, then it will be fabricated from an opaque material such as a conventional fabric, a plasticized cloth, or the like. While light shield 11 may be of any desired shape, yet it is preferable that it possess a rectangular configuration as shown.

Light shield 11 is mounted upon lateral slide rod 12 by means of clips 13 and 14. These clips may be riveted (by means of rivets 15 and 16) to light shield 11 so that the light shield 11 may be slideably attached to slide rod 12. The clips 13 and 14 are provided with hollow bosses 17 and 18, the interior of these bosses frictionally engaging slide rod 12. This frictional engagement may be provided by the metal-to-metal contact upon the clips and slide rod; or, rubber jacketed clips, known in the industry by the trade name Adel clips, may be employed to serve as the clips 13 and 14. Other types of immediate or ultimate frictional engagement between the clips and the slide rod might reasonably be employed. The purpose for such frictional engagement is, of course, to allow for the selective rotational displacement of light shield 11 about slide rod 12. Additionally, such frictional engagement permits light shield 11 to be extended (to the right of the viewer) to a second or extended position and to be retained in the extended position by such frictional engagement.

Auxiliary light shield apparatus 10 also includes a pair of resilient clamps, or doubled-back clamping strips 19 which are soldered, welded, spot-welded, or otherwise affixed to an end and to a medial area of slide rod 12. If it is assumed that the fragmentary dotted line indication 20 in Figure 1 indicates the permanent visor or permanent glare shield of the motor vehicle, then it will be seen that the resilient clamps 19 mount upon the permanent light shield so as to dispose slide rod 12 in a position parallel to and in close proximity with the axis of rotation of the permanent light shield installation.

Figure 2:
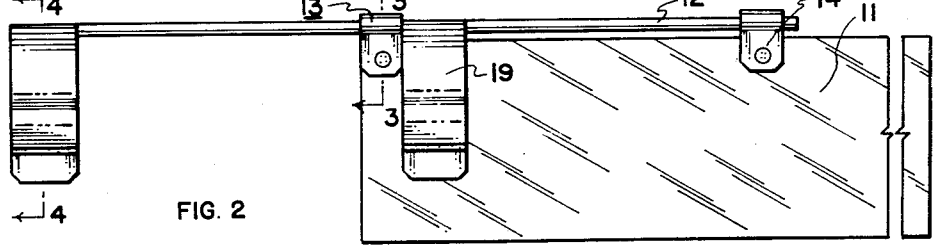
Figure 2 is a front elevation of the auxiliary light shield apparatus of the present invention, but with the light shield itself shown in extended position.

Figure 2 is similar to Figure 1, but illustrates the extended position of the light shield 11. In the case of Figure 2, the right resilient clamp 19 may serve as a stop for mounting clip 13.

Figure 3:
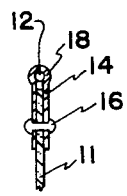
Figure 3 is a fragmentary sectional view taken along the line 3—3 in Figure 2.

Figure 3 illustrates in cross-section the configuration of clips 13 and 14 and their rivet attachment to light shield 11. The two legs of the clip, together with the plastic light shield 11, may be line drilled and riveted in a single operation. The boss 18 which extends outwardly from the upper periphery of light shield 11 accommodates the positioning therewithin of slide rod 12.

Figures 4A, 4B, 4C:
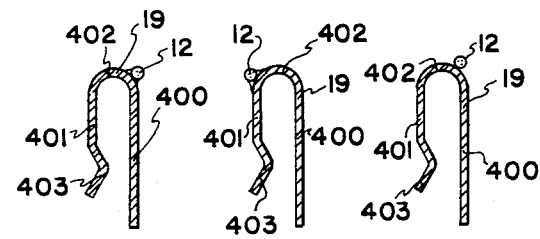
Figure 4A is a sectional view of the clamp employed by the present invention, taken along the line 4—4 in Figure 2.
Figure 4B is similar to Figure 4A, but with the juncture of the clamp and the slide rod shown at an opposite point along the outer periphery of the clamp relative to that indicated in Figure 4A.
Figure 4C is similar to Figure 4B, but with the slide rod being shown spotwelded to the clamp rather than soldered as indicated in Figures 4A and 4B.

Figure 4A illustrates in cross-section the configuration of resilient clamp 19. Resilient clamp 19 is a doubled-back clamping strip and is shown to consist of two legs 400 and 401 and a curved interjoining portion 402, the latter joining the two legs of resilient clamping strip. It is to be noted that leg 401 is provided with an end portion 403, which is inclined with respect to the disposition of the remaining leg. The purpose of inclining end portion 403 is to provide a cam surface, in effect, so as to facilitate insertion of the permanent visor or glare shield in between the legs of the clamp.

It will of course be understood that for all auxiliary light shield installations the visor, whether permanent or auxiliary, should be nearest the driver or passenger. This is to permit the glare shield to be positioned vertically in an operative disposition, with the visor associated with the same disposed horizontally in an inoperative condition. Hence when the motor vehicle is already provided with a permanent visor and it is desired that an auxiliary glare shield be installed, then the configuration of the apparatus will be as illustrated in Figures 1, 2, and 4A. In cases where a glare shield is already permanently mounted in the motor vehicle and it is desired to add an auxiliary visor, then the resilient clamps or clamp strips 19 in Figures 1 and 2 will be disposed behind the auxiliary visor 11 and the slide rod 12 will be affixed to resilient clamps 19 as illustrated in Figure 4B. Figures 4A and 4B illustrate the slide rod as being attached to the resilient clamps by means of a suitable lead or silver solder. Figure 4C is to be understood as illustrating that the slide rod may in fact be spotwelded to the clamps. In fact, such spotwelding may well be desirable for the purpose illustrated by the configuration of Figures 5 and 6 since, in the case of spotwelding, no bulky solder formations will persist upon the precise point of juncture of the slide rod with the clamps.

Figure 6:
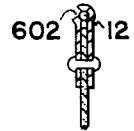
Figure 6 is a fragmentary sectional view taken along the line 6—6 in Figure 5, illustrating the type of clip which may be employed in the apparatus of Figure 5 so as to permit the light shield to be translated or slid along the associated slide rod beyond the intermediately-positioned mounting clamp.
Figure 5:
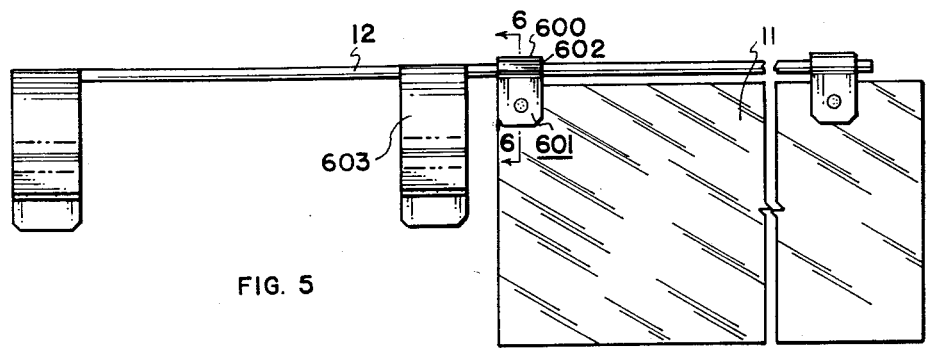
Figure 5 is a front elevational view of a modification of the auxiliary light shield apparatus of the present invention, with the light shield proper and the slide rod illustrated as broken away, for the purpose of conservation of space.

The configurations of the apparatus and rear side clamp illustrated in Figures 5 and 6 are similar to those illustrated in Figures 2 and 3, respectively, but with the important exception that the boss 600 of slide clip 601 is provided with a radial, lateral slit 602. It is the slit 602 which enables clip 601 and, hence light shield 11 to slip past and slide by the juncture of resilient mounting clamp 603 and slide rod 12. Accordingly, the travel of light shield 11 will not be limited by the stop contact of the right clamp 19 with clip 13 as shown in Figure 1.

It should be mentioned at this point that light shield 11 may be but a few inches longer than the permanently-installed visor, or it may be perhaps twice as long as the visor, so as to give extended protection not only for the driver but also protection for the passengers seated to his right. If the glare shield is in fact of reduced length, then the configuration shown in Figure 5 may be used, since, in Figure 5, the light shield is enabled to slide past the driver's mounting clamps and to be positioned for convenient use by the passenger.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Auxiliary light shield apparatus mountable upon the rotationally displaceable, driver's light shield which is permanently mounted within the passenger interior of a motor vehicle, said auxiliary light shield apparatus including, in combination; a slide rod disposed parallel to and in proximity with the axis of rotational displacement of said driver's light shield, said slide rod being provided with first and second clamp means disposed at an end and at a medial area thereof, respectively, and engageable with said driver's light shield for mounting said auxiliary light shield apparatus thereto; an auxiliary light shield; and first and second means for slideably mounting said auxiliary light shield to said slide rod for selective extension of said auxiliary light shield beyond said driver's light shield, said first means being disposed between said first and second clamp means, and said second means engaging said rod beyond said second clamp means.

2. Apparatus according to claim 1 in which said first and second mounting means comprise a pair of clips securely affixed to said auxiliary light shield and having hollow bosses extending beyond the upper periphery of said auxiliary light shield, said slide rod being frictionally journalled within at least one of said bosses.

3. Apparatus according to claim 2 in which the boss of that clip which is rearwardly with respect to the other when said auxiliary light shield is being extended beyond said driver's light shield is provided with a radial slit for enabling said clip to slip past the juncture of said slide rod and said second clamp means via said slit, which juncture would otherwise impede the progress thereof.

4. Glare shield apparatus mountable upon and in front of the rotationally displaceable, driver's visor which is permanently mounted within the passenger interior of a motor vehicle, said glare shield apparatus including, in combination: a slide rod disposed parallel to and in proximity with the axis of rotational displacement of said visor, said slide rod being provided with first and second clamp means disposed at an end at a medial area thereof, respectively, and engageable with said visor for mounting said glare shield apparatus thereto; a glare shield; and first and second means for slideably mounting said glare shield to said slide rod for selective extension of said glare shield beyond said visor, said first means being disposed between said first and second clamp means, and said second means engaging said rod beyond said second clamp means.

5. Visor apparatus mountable upon and in the rear of the rotationally displaceable, driver's glare shield which is permanently mounted within the passenger interior of a motor vehicle, said visor apparatus including, in combination: a slide rod disposed parallel to and in proximity with the axis of rotational displacement of said glare shield, said slide rod being provided wtih first and second clamp means disposed at an end and a medial area thereof, respectively, and engageable with said glare shield for mounting said visor apparatus thereto; a visor; and first and second means for slideably mounting said visor to said slide rod for selective extension of said visor beyond said glare shield, said first means being disposed between said first and second clamp means, and said second means engaging said rod beyond said second clamp means.

6. Auxiliary glare shield apparatus mountable upon the rotationally displaceable, driver's glare shield which is permanently mounted within the pasesnger interior of a motor vehicle, said auxiliary glare shield apparatus including, in combination: a slide rod disposed parallel to and in proximity with the axis of rotational displacement of said driver's glare shield, said slide rod being provided with first and second clamp means disposed at an end and a medial area thereof, respectively, and engageable with said driver's glare shield for mounting said auxiliary glare shield apparatus thereto; an auxiliary glare shield; and first and second means for slideably mounting said auxiliary glare shield to said slide rod for selective extension of said auxiliary glare shield beyond said driver's glare shield, said first means being disposed between said first and second clamp means, and said second means engaging said rod beyond said second clamp means.

7. Auxiliary visor apparatus mountable upon the rotationally displaceable, driver's visor which is permanently mounted within the passenger interior of a motor vehicle, said auxiliary visor apparatus including, in combination: a slide rod disposed parallel to and in proximity with the axis of rotational displacement of said driver's visor, said slide rod being provided with first and second clamp means disposed at an end at a medial area thereof; respectively, and engageable with said driver's visor for mounting said auxiliary visor thereto; an auxiliary visor; and first and second means for slideably mounting said auxiliary visor to said slide rod for selective extension of said auxiliary visor beyond said driver's visor, said first means being disposed between said first and second clamp means, and said second means engaging said rod beyond said second clamp means.

References Cited in the file of this patent

UNITED STATES PATENTS

| 1,795,184 | Smith | Mar. 3, 1931 |
| 2,096,142 | Stover | Oct. 19, 1937 |
| 2,257,612 | Lininger | Sept. 30, 1941 |

FOREIGN PATENTS

| 509,335 | Italy | Jan. 13. 1955 |